(12) United States Patent
Yushina et al.

(10) Patent No.: US 7,732,512 B2
(45) Date of Patent: Jun. 8, 2010

(54) LASER LIGHT TRANSMITTING COLORED POLYOLEFIN RESIN COMPOSITIONS AND PROCESS FOR LASER WELDING

(75) Inventors: Heihachi Yushina, Osaka (JP); Osamu Nakagawa, Ikoma (JP)

(73) Assignee: Orient Chemical Industries Co., Ltd., Osaka (JP)

( * ) Notice: Subject to any disclaimer, the term of this patent is extended or adjusted under 35 U.S.C. 154(b) by 51 days.

(21) Appl. No.: 10/544,317

(22) PCT Filed: Feb. 12, 2004

(86) PCT No.: PCT/JP2004/001459
§ 371 (c)(1),
(2), (4) Date: Aug. 1, 2005

(87) PCT Pub. No.: WO2004/072175
PCT Pub. Date: Aug. 26, 2004

(65) Prior Publication Data
US 2006/0142451 A1   Jun. 29, 2006

(30) Foreign Application Priority Data
Feb. 13, 2003   (JP) ............... 2003-034516

(51) Int. Cl.
*C08F 290/06*   (2006.01)
*C08K 5/23*   (2006.01)
*C08K 5/07*   (2006.01)
*C08K 5/00*   (2006.01)
*B60C 1/00*   (2006.01)
*C08K 3/04*   (2006.01)

(52) U.S. Cl. .............. 524/81; 524/190; 524/357; 524/358; 524/495; 524/496

(58) Field of Classification Search .......... 524/81, 524/495, 190, 358, 357, 496
See application file for complete search history.

(56) References Cited
U.S. PATENT DOCUMENTS

2003/0039837 A1 * 2/2003 Koshida et al. .......... 428/411.1

2003/0065074 A1   4/2003 Koshida et al.
2003/0088076 A1 * 5/2003 Koshida et al. ............ 534/653

FOREIGN PATENT DOCUMENTS
JP   11-170371   6/1999

(Continued)

Primary Examiner—William K Cheung
(74) Attorney, Agent, or Firm—McGlew and Tuttle, P.C.

(57) ABSTRACT

Laser ray transmitting colored polyolefin resin composition containing an anthraquinone salt forming dye below; and method of laser welding wherein welding a portion of contact of a laser ray transmitting material of said resin composition and a laser ray absorbing material by irradiating laser ray so that the laser ray transmitting material transmits the laser ray and the laser ray is absorbed in the laser ray absorbing material with the laser ray transmitting material and the laser ray absorbing material in contact with each other:

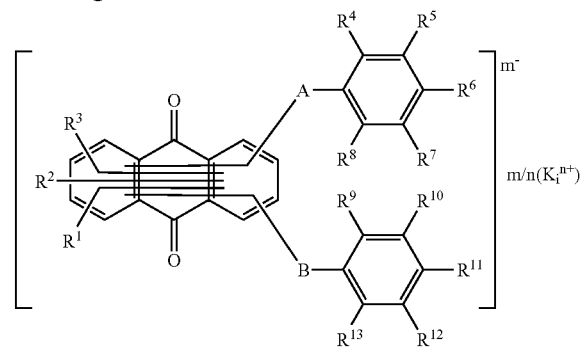

A, B: —NH— or —O—; $R^1$-$R^3$: hydrogen, amino, hydroxy, halogen; $R^4$-$R^{13}$: hydrogen, alkyl, nitro, sulfonic group; $K_i^{n+}$: organic ammonium ion; m: 1 or 2; n: 1 or 2; the sulfonic group is —$SO_3$ or $SO_3M$, the number of —$SO_3$ being m, M representing hydrogen or an alkali metal.

26 Claims, 1 Drawing Sheet

FOREIGN PATENT DOCUMENTS

| | | |
|---|---|---|
| JP | 2001-71384 | 3/2001 |
| JP | 2001-105499 | 4/2001 |
| JP | 2002-228830 | 8/2002 |
| WO | WO 01/44357 A1 | 6/2001 |
| WO | WO 02/36329 A1 | 5/2002 |

* cited by examiner

LASER LIGHT TRANSMITTING COLORED POLYOLEFIN RESIN COMPOSITIONS AND PROCESS FOR LASER WELDING

FIELD OF THE INVENTION

The present invention relates to a laser ray transmitting colored polyolefin resin composition containing an anthraquinone salt forming dye and a method of laser welding using the laser ray transmitting colored polyolefin resin composition.

BACKGROUND ART

Figure 1:
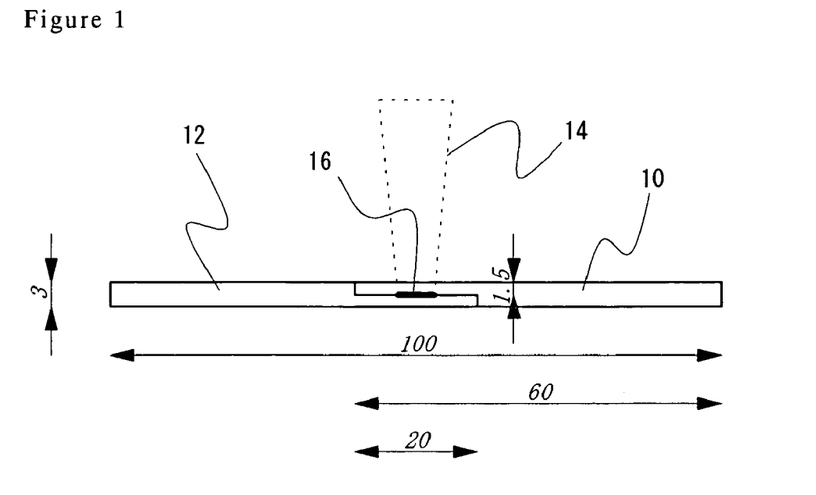
FIG. 1 is a lateral view of the laser welding test.

Laser welding of synthetic resin materials can, for example, be conducted as described below. As shown in FIG. 1, one part incorporating a laser ray transmitting material and another part incorporating a laser ray absorbing material are brought into contact with each other. When irradiating laser ray from the laser ray transmitting material side to the laser ray absorbing material, the laser ray that has transmitted the laser ray transmitting material is absorbed in the laser ray absorbing material and generates heat. By this heat, the laser ray absorbing material is molten around the portion that has absorbed the laser ray, and the laser ray transmitting material is also molten, the resins of the two parts fuse together, and upon cooling sufficient welding strength is obtained and the laser ray transmitting material and the laser ray absorbing material are joined firmly. Features of laser welding include the capability of welding without bringing the laser ray generation portion in contact with the portion to be welded, the minimal thermal effect on the surrounding portion because the heating is localized, freedom from the problem of mechanical vibration, the capability of welding of fine portions and structures, high reproducibility, maintenance of high air-tightness, high welding strength, inconspicuous welded portion, and no generation of dust etc.

Traditionally, resin parts have been joined together by clamping with clamping parts (bolts, screws, clips, etc.), adhesion using adhesives, vibration welding, ultrasonic welding, etc. According to laser welding, labor saving, productivity improvements, production cost reductions, etc. can be achieved because secure welding is achieved by simple operation to provide strength equivalent to or more than the levels expected by conventional method and in addition vibration and heat have minimal effects. With these features, laser welding is suitable for the joining of functional components, electronic components, etc., for which the avoidance of the influence of vibration or heat is desired in, for example, automobile industry, electric/electronic industry and other fields, and is applicable to the joining of resin parts of complex shapes.

As a technology concerning laser welding, Japanese Patent Laid-Open No. HEI-11-170371 describes a method of laser welding comprising a process wherein laser ray is irradiated so that it focuses on a portion where an opaque part comprising a laser ray absorbing thermoplastic synthetic resin and a colorless transparent part comprising a laser ray transmitting thermoplastic synthetic resin are in contact with each other. In this case, however, when viewed from the colorless transparent part side, the welded portion differs from the non-welded portion in color and smoothness, posing a problem of poor appearance.

Additionally, WO02/36329 describes laser welding of a polyolefin resin using an anthraquinone dye and a perinone dye as colorants. However, if a common neutral dye is used to color a polyolefin resin, the dye is unlikely to fix due to the weak binding of polyolefin resins to dyes and in addition because the neutral dye used is very highly soluble in resins, posing a problem of the bleeding phenomenon, in which the dye migrates elsewhere in the event of contact with another polyolefin resin. This has been a critical problem not only in the use of laser welding, but also in general situations of coloring polyolefin resins.

The present invention has been developed in view of the aforementioned problems in the prior art, and is intended to provide a laser ray transmitting colored polyolefin resin composition that is highly transmittable for laser ray wavelength band (wavelengths from 800 nm to 1200 nm, e.g., 808, 820, 840, 940, and 1064 nm), that undergoes no color fading of the colored polyolefin resin part in the heat treatment process prior to laser welding of the resin part, that permits laser welding with substantially no sublimation of dye, and that possesses sufficient anti-bleeding quality, and a method of laser welding using the same laser ray transmitting colored polyolefin resin composition.

DISCLOSURE OF THE INVENTION

The laser ray transmitting colored polyolefin resin composition of the present invention contains an anthraquinone salt forming dye (i.e., a salt forming dye composed of an anionic component which is obtainable from an anthraquinone acid dye and an organic ammonium component) represented by Formula (1) below:

in Formula (1), each of A and B independently represents —NH— or —O—, each of $R^1$ to $R^3$ independently represents hydrogen, an amino group, a hydroxy group or a halogen, each of $R^4$ to $R^{13}$ independently represents hydrogen, an alkyl group, a nitro group or a sulfonic group, $K_i^{n+}$ represents an organic ammonium ion, m represents 1 or 2, and n represents 1 or 2;

the sulfonic group is —$SO_3^-$ or $SO_3M$, the number of —$SO_3^-$ being m, M representing hydrogen or an alkali metal, and each of M may be identical or not provided that the number of $SO_3M$ is 2 or more.

An anthraquinone salt forming dye represented by Formula (1) above fixes stably in polyolefin resins, in which dyes are unlikely to fix due to weak binding to dyes, and is well compatible with resins. Therefore, by coloring with this anthraquinone salt forming dye, it is possible to obtain a laser ray transmitting polyolefin resin part that is stable to heat, that is unsusceptible to environment, and that possesses excellent laser transmission.

A big feature of the above-described anthraquinone salt forming dye resides in that two of the following structure are present in the anthraquinone structure.

It is also important that the number of sulfonic groups in the anthraquinone salt forming dye should be adjusted.

The laser ray transmitting colored polyolefin resin composition of the present invention well transmits ray in the wavelength range from about 800 nm by semiconductor laser to about 1100 nm by YAG laser, i.e. laser ray, exhibits high fastness such as to heat and light, has a good anti-migration property, chemical resistance, etc., and exhibits a brilliant color. The colored resin part with this laser ray transmitting colored polyolefin resin composition permits laser welding without fading of the color of the resin part in the heat treatment process prior to laser welding, with substantially no dye sublimation. The laser ray transmitting colored polyolefin resin composition of the present invention colored using a master batch is more uniformly colored, does not exhibit light scattering due to the colorant, and exhibits good laser transmission.

Meantime, the method of laser welding of the present invention comprises welding a contact portion of a laser ray transmitting material comprising any of the aforementioned laser ray transmitting colored polyolefin resins and a laser ray absorbing material by irradiating laser ray so that the laser ray transmitting material transmits the laser and the laser is absorbed in the laser ray absorbing material with the laser ray transmitting material and the laser ray absorbing material in contact with each other.

According to the method of laser welding of the present invention, a portion of contact of a laser ray transmitting material and a laser ray absorbing material can be welded by irradiating laser ray so that the laser ray transmitting material transmits the laser and the laser is absorbed in the laser ray absorbing material with the laser ray transmitting material and the laser ray absorbing material in contact with each other. The laser ray transmitting material in this method of laser welding permits laser welding without fading of the color of the resin part in the heat treatment process prior to laser welding, with substantially no dye sublimation.

MODE FOR EMBODYING THE INVENTION

The laser ray transmitting colored polyolefin resin composition of the present invention contains at least an anthraquinone salt forming dye represented by Formula (1) above. Because this anthraquinone salt forming dye has a large molecular weight and is highly bindable to polyolefin resins, particularly polypropylene resins, it acts effectively on heat resistance and anti-sublimation quality in the laser ray transmitting colored polyolefin resin composition of the present invention.

The polyolefin resin used in the present invention is not subject to limitation.

As examples thereof, there may be mentioned homopolymers of α-olefins such as ethylene, propylene, butene-1, 3-methylbutene-1, 4-methylpentene-1 and octene-1 or copolymers thereof, or copolymers (as copolymers, there may be mentioned block copolymers, random copolymers, and graft copolymers) of these and other copolymerizable unsaturated monomers.

Specifically, there may be mentioned polyethylene resins such as high-density polyethylene, intermediate-density polyethylene, low-density polyethylene, linear low-density polyethylene, ethylene-vinyl acetate copolymer and ethylene-ethyl acrylate copolymer; polypropylene resins such as propylene homopolymers, propylene-ethylene block copolymers or random copolymers and propylene-ethylene-butene-1 copolymers; polybutene-1, poly-4-methylpentene-1, etc.

These polyolefin resins may be used singly or in combination of two or more species. As other examples of polyolefin resins in the present invention, there may be mentioned polyolefin elastomers such as polypropylene resin elastomers, various thermoplastic elastomers (including various rubbers) containing the above-described resins as main component, polyolefin resins containing synthetic waxes or natural waxes, and the like.

In the present invention, it is preferable that, of these, a polypropylene resin and/or a polyethylene resin be used. A polypropylene resin is particularly preferred. This polypropylene resin is not subject to limitation and can be used over a broad range of molecular weight.

As a polyolefin resin, there may be used an acid-modified polyolefin modified with an unsaturated carboxylic acid or a derivative thereof, foaming polypropylene containing a foaming agent added to the resin without affecting the desired effect, and the like.

As propylene copolymers like as described above, those containing propylene at 75% by weight or more, particularly at 90% by weight or more, are preferred because they retain the crystallinity, rigidity, chemical resistance, etc. that characterize polypropylene resins.

As specific examples of the aforementioned copolymerizable monomer, there may be mentioned one species or two or more species of α-olefins having 2 or 4 to 12 carbon atoms, such as ethylene, 1-butene, isobutene, pentene-1, 3-methyl-butene-1, hexene-1, 4-methyl-pentene-1, 3,4-dimethyl-butene-1, heptene-1, 3-methyl-hexene-1, octene-1, and decene-1;

cycloolefins such as cyclopentene, norbornane, and 1,4,5,8-dimethano-1,2,3,4,4a,8,8a-6-octahydronaphthalene;

dienes such as 5-methylene-2-norbornane, 5-ethylidene-2-norbornane, 1,4-hexadiene, methyl-1,4-hexadiene, and 7-methyl-1,6-octadiene;

vinyl monomers such as vinyl chloride, vinylidene chloride, acrylonitrile, vinyl acetate, acrylic acid, methacrylic acid, butyl acrylate, methyl methacrylate, and maleic anhydride; and the like.

An anthraquinone salt forming dye in the present invention can be obtained by a salt-forming reaction of an anion from an anthraquinone acid dye and an organic ammonium ion (e.g., cations from primary amine, secondary amine, tertiary amine, guanidines, or rosin amines, etc.). This salt-forming reaction may employ a commonly known ionic reaction. For example, an acid dye component having two sulfonic groups is dispersed in water, an organic amine component in a ratio of 1.5 to 2.3 mols per mol of the dye is dissolved in aqueous hydrochloric acid; this solution is added drop by drop to the dispersion liquid, and the reaction is carried out with stirring for several hours. By filtering this reaction mixture, washing the cake filtered out with water, and drying it, an anthraquinone salt forming dye of the present invention can be obtained.

With respect to Formula (1) above, which represents an anthraquinone salt forming dye in the present invention, A, B and $R^1$ to $R^{13}$ represent the following groups or atoms, respectively.

Each of A and B independently represents —NH— or —O—.

Each of $R^1$ to $R^3$ independently represents hydrogen, an amino group, a hydroxy group or a halogen (e.g., Cl, Br).

Each of $R^4$ to $R^{13}$ independently represents hydrogen, an alkyl group (e.g., alkyl groups having 1 to 8 carbon atoms, such as methyl, ethyl, propyl, isopropyl, n-butyl, tert-butyl, n-pentyl, isopentyl, hexyl, heptyl and octyl), a nitro group or a sulfonic group.

$Ki^{n+}$ represents an organic ammonium ion; m represents 1 or 2, and n represents 1 or 2.

Referring to the laser ray transmitting colored polyolefin resin composition of the present invention, it is preferable that in Formula (1) above, at least one of $R^4$ to $R^8$ be a sulfonic group, and also at least one of $R^9$ to $R^{13}$ be a sulfonic group.

As specific examples of the anthraquinone acid dye corresponding to the anionic component of the anthraquinone salt forming dye in the present invention, the following examples may be mentioned. However, the present invention is not limited to these examples.

Example Compound (1)-1

Example Compound (1)-2

Example Compound (1)-3

Example Compound (1)-4

Example Compound (1)-5

In Formula (1) above, $Ki^{n+}$ is an organic ammonium ion that constitutes the organic ammonium component of an anthraquinone salt forming dye in the present invention, and may be one represented by Formula (2) or (3) below.

(2)

(3)

In Formula (2) above, each of $R^{14}$ through $R^{17}$ independently represents, hydrogen, an alkyl group (e.g., alkyl groups having 1 to 12 carbon atoms that may be branched, such as methyl, ethyl, n-propyl, isopropyl, n-butyl, isobutyl, tert-butyl, n-pentyl, isopentyl, tert-pentyl, hexyl, heptyl, octyl, nonyl, decyl, undecyl and dodecyl), a cycloalkyl group (e.g., cycloalkyl groups having 3 to 8 carbon atoms, such as cyclopropyl, cyclopentyl, cyclohexyl and cycloheptyl, or dihydroaziethylamine residues), an alkoxyalkyl group (e.g., alkoxyalkyl groups having 2 to 20 carbon atoms, such as [methoxy, ethoxy, propoxy, butoxy, pentyloxy, hexyloxy, or octyloxy, etc.]-[methyl, ethyl, propyl, butyl, pentyl, or octyl, etc.] etc., i.e., ethoxymethyl, methoxyethyl, etc.), an alkanol group (e.g. —$CH_2OH$, —$C_2H_4OH$, —$C_3H_6OH$, etc.), an aryl group (e.g., phenyl, lower-alkyl-substituted phenyls, halogenated phenyls, naphthyl, aminonaphthyls) having or not having a substituent [e.g., amino groups, lower (1 to 4 carbon atoms) alkyl groups, halogens such as Cl and Br], an aralkyl group (e.g., benzyl group, α-methylbenzyl group, α,α-dimethylbenzyl group, α-butylbenzyl group, phenethyl group, naphthylalkyl groups [e.g., naphthylmethyl, naphthylethyl, etc.]) having or not having a substituent [e.g., amino groups, alkyl groups having 1 to 4 carbon atoms, halogens such as Cl and Br], or a group represented by Formula (C) below.

(C)

In Formula (3) above, each of $R^{18}$ to $R^{21}$ independently represents hydrogen or an aryl group (e.g., phenyl, lower-alkyl-substituted phenyls, halogenated phenyls, naphthyl, aminonaphthyls) having or not having a substituent [e.g., amino group, lower (1 to 4 carbon atoms) alkyl groups, halogens such as Cl and Br].

Organic ammonium components represented by Formulas (2) and (3) above can be obtained from organic amines exemplified below, which, however, are not to be construed as limiting the present invention.

Specifically, there may be mentioned aliphatic amines such as hexylamine, pentylamine, octylamine, 2-ethylhexylamine, di-(2-ethylhexyl)amine and dodecylamine;

alicyclic amines such as cyclohexylamine, di-cyclohexylamine and dihydroaziethylamine;

alkoxyalkylamines such as 3-propoxypropylamine, di-(3-ethoxypropyl)amine, 3-butoxypropylamine, octoxypropylamine and 3-(2-ethylhexyloxy)propylamine;

naphthylamines such as α-naphthylamine, β-naphthylamine, 1,2-naphthylenediamine, 1,5-naphthylenediamine and 1,8-naphthylenediamine;

naphthylalkylamines such as 1-naphthylmethylamine;

alkanol-group-containing amines such as N-cyclohexylethanolamine, N-dodecylethanolamine and N-dodecylimino-diethanol;

and guanidines (derivatives) such as 1,3-diphenylguanidine, 1-o-tolylguanidine and di-o-tolylguanidine.

Of the organic ammonium components represented by Formula (2) above, those that are particularly preferred are shown in Table 1.

| | TABLE 1 | | | |
|---|---|---|---|---|
| | $R^{14}$ | $R^{15}$ | $R^{16}$ | $R^{17}$ |
| S-1 | H | H | H | ![structure] |
| S-2 | H | H | H | —$(CH_2)_3$—O—$CH_2(C_2H_5)$—$CH_2$—$C_4H_9$ |

TABLE 1-continued

| | $R^{14}$ | $R^{15}$ | $R^{16}$ | $R^{17}$ |
|---|---|---|---|---|
| S-3 | H | H | H |  |

Of the organic ammonium components represented by Formula (3) above, those that are particularly preferred are shown in Table 2.

TABLE 2

| | $R^{18}$ | $R^{19}$ | $R^{20}$ | $R^{21}$ |
|---|---|---|---|---|
| S-4 | H |  o-CH₃-C₆H₄ | H |  o-CH₃-C₆H₄ |
| S-5 | H |  benzyl | H |  benzyl |

In particular, aromatic guanidines as shown in Table 2 are unlikely to volatilize under heating in an extruding machine, an injection molding machine and the like. Hence, of the anthraquinone salt forming dyes represented by Formula (1) above, those having such an aromatic guanidine as the organic ammonium component are unlikely to decompose, even through processes such as thermal melting during molding, and exhibit excellent dispersibility in the molded product. As a result, the molded product obtained is excellent in laser ray transmission.

The anthraquinone salt forming dye used in the present invention has a color such as blue, purple or green. As a colorant for the laser ray transmitting colored polyolefin resin composition of the present invention, there may be used an anthraquinone salt forming dyes having various colors alone, or two species or more of such salt forming dyes in combination. Also, as a colorant for the laser ray transmitting colored polyolefin resin composition of the present invention, there may be used one species or two species or more of pigments or dyes that have an absorption band only outside the visible light absorption band of the anthraquinone salt forming dye or have an absorption band outside the visible light in addition to visible light absorption band, and that allows light transmission in the wavelength band of laser ray (wavelength from 800 nm to 1200 nm), along with the aforementioned anthraquinone salt forming dye. By blending dyes or pigments having a color such as yellow or red, that are other colorants offering good laser transmission as described above, it is possible to impart various colors. For example, by combining a purple dye among the aforementioned anthraquinone salt forming dyes and another yellow colorant, it is possible to impart a black color. Of the laser ray transmitting colored polyolefin resin compositions, black resin compositions are industrially important.

As examples of such other colorants that are capable of imparting colors to resin, there may be mentioned azo salt forming dyes and/or anthrapyridone dyes that exhibit chromatic colors such as yellow, orange and red, and that transmit laser.

As specific examples of acid dyes corresponding to the anion components of azo salt forming dyes that can be used along with an anthraquinone salt forming dye of Formula (1) in the laser ray transmitting colored polyolefin resin composition of the present invention, the following examples may be mentioned. Red acid dyes such as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 143, 144, 148, 150, 151, 176, 231 and 266; and yellow acid dyes such as C.I. Acid Yellow 4, 9, 17, 18, 19, 23, 36, 41, 42, 49, 105, 199, 200 and 219. However, the present invention is not limited by these examples.

As specific examples of acid dyes corresponding to the anion components of anthrapyridone salt forming dyes that can be used along with an anthraquinone salt forming dye of Formula (1) in the laser ray transmitting colored polyolefin resin composition of the present invention, there may be mentioned red acid dyes such as C.I. Acid Red 80, 81, 82 and 143. However, the present invention is not limited by these examples.

The amount of colorant used in the laser ray transmitting colored polyolefin resin composition of the present invention may, for example, be 0.01 to 10% by weight relative to polyolefin resin. The amount is preferably 0.1 to 5% by weight, more preferably 0.1 to 1% by weight.

A master batch (high-concentration molded product) of the laser ray transmitting colored polyolefin resin composition of the present invention is obtained by, for example, blending polyolefin resin powder or pellets as a master batch base and a colorant containing at least an anthraquinone salt forming dye of Formula (1) above in a tumbler or super-mixer and the like, and then pelletizing or coarsely granulating it by thermal melting in an extruder, batch-wise kneader, roll kneader, or the like. A master batch can also be obtained by, for example, adding the aforementioned colorant to polyolefin resin for a master batch base while remaining in solution after synthesis, and then removing the solvent.

By blending the thus-obtained colored pellets or coarsely granulated colorant (this colorant form is referred to as master batch in the present invention) with a polyolefin resin and molding this by a conventional method, it is possible to obtain a more uniform laser ray transmitting resin part of excellent laser transmission quality. In particular, when using a black mixed colorant of a combination of an anthraquinone salt forming dye and a plurality of colorants, this effect is remarkable.

As such, the master batch may contain the aforementioned colorant at 1 to 30% by weight, for example, relative to the amount of polyolefin resin. The content ratio is preferably 5 to 15% by weight.

$T_{colored\ resin}/T_{noncolored\ resin}$, i.e., the ratio of $T_{colored\ resin}$, the transmittance for a laser ray having a wavelength of 940 nm in the laser ray transmitting colored polyolefin resin composition of the present invention, and $T_{noncolored\ resin}$, the transmittance for a laser ray having a wavelength of 940 nm in a noncolored resin of the same but without a colorant, is preferably 0.8 to 1.2.

The laser ray transmitting colored polyolefin resin composition of the present invention may contain appropriate amounts of various reinforcing materials according to its application and intended use. These reinforcing materials are not particularly limited, as long as it is usable for ordinary reinforcement of synthetic resins. For example, glass fiber, carbon fiber, other inorganic fibers, and organic fibers (aramid, polyphenylene sulfide, nylon, polyester, liquid crystal polymer, etc.), etc. can be used, with preference given to glass fiber for reinforcement of resins that require transparency. The fiber length of glass fiber is preferably 2 to 15 mm and the fiber diameter is preferably 1 to 20 µm. The form of glass fiber is not subject to limitation, and may be of any one, e.g., roving or milled fiber. These glass fibers may be used singly or in combination of two or more kinds. Their content is preferably 5 to 120% by weight relative to 100% by weight of polyolefin resin. If the content is less than 5% by weight, a sufficient glass fiber-reinforcing effect is unlikely to be attained; if the content exceeds 120% by weight, moldability is likely to decrease. Their content is preferably 10 to 60% by weight, particularly preferably 20 to 50% by weight.

The laser ray transmitting colored polyolefin resin composition of the present invention may contain appropriate amounts of various fillers according to its application and intended use. There can be used, for example, tabular fillers such as mica, sericite and glass flake, silicates such as talc, kaolin, clay, wollastonite, bentonite, asbestos and alumina silicate, metal oxides such as alumina, silicon oxide, magnesium oxide, zirconium oxide and titanium oxide, carbonates such as calcium carbonate, magnesium carbonate and dolomite, sulfates such as calcium sulfate and barium sulfate, and particulate fillers such as glass beads, ceramic beads, boron nitride and silicon carbide. As an example of a preferred filler in the present invention, there may be mentioned talc. Although useful particle diameters of the filler range widely, from as fine as 0.03 µm to about 100 µm, those having particle diameters of 0.03 to 10 µm are preferred for the laser ray transmitting colored polyolefin resin composition and method of laser welding of the present invention. The filler content is preferably 5 to 50% by weight relative to 100% by weight of polyolefin resin. If the content is less than 5% by weight, a sufficient effect for a filler is unlikely to be attained; if the content exceeds 50% by weight, laser transmission decreases considerably. The content is preferably 10 to 50% by weight, particularly preferably 10 to 40% by weight.

The laser ray transmitting colored polyolefin resin composition of the present invention may also be formulated with various additives as necessary. Such additives include, for example, auxochromic agents, dispersing agents, stabilizers, plasticizers, quality-improving agents, ultraviolet absorbents or light stabilizers, antioxidants, antistatic agents, lubricants, mold-releasing agents, crystallization promoters, crystal nucleating agents, and flame retardants.

The laser ray transmitting colored polyolefin resin composition of the present invention is obtained by blending raw materials by an optionally chosen method of blending. It is generally preferable that these blending ingredients be homogenized to the maximum possible extent. Specifically, for example, all raw materials are blended and homogenized in a mechanical mixer such as a blender, kneader, Banbury mixer, roll mixer or extruder to yield a colored polyolefin resin composition. Alternatively, after some raw materials are blended in a mechanical mixer, the remaining ingredients are added, followed by further blending and homogenization, to yield a resin composition. Additionally, previously dry-blended raw materials may be kneaded and homogenized in a molten state in a heated extruder, then extruded into a needle, which needle is then cut into desired length to yield a colored granular resin composition (colored pellets).

Molding of the laser ray transmitting colored polyolefin resin composition of the present invention can be achieved by various procedures in common use. For example, the laser ray transmitting colored polyolefin resin composition of the present invention can be molded using colored pellets in a processing machine such as an extruder, injection molding machine or roll mill, and can also be molded by blending polyolefin resin pellets or powder, a milled colorant, and where necessary various additives, in an appropriate mixer, and molding this blend using a processing machine. Any commonly used method of molding can be adopted, e.g., injection molding, extrusion molding, compression molding, foaming molding, blow molding, vacuum molding, injection blow molding, rotation molding, calender molding, and solution casting. By such molding, laser ray transmitting materials in various shapes can be obtained.

The method of laser welding of the present invention comprises welding a portion of contact of a laser ray transmitting material comprising the aforementioned laser ray transmitting colored thermoplastic resin composition and a laser ray absorbing material by irradiating laser ray so that the laser ray transmitting material transmits the laser ray and the laser ray is absorbed in the laser ray absorbing material with the laser ray transmitting material and the laser ray absorbing material in contact with each other.

As examples of combinations of resins that permit laser welding in the method of laser welding of the present invention, there may be mentioned a combination of polypropylene resins, a combination of polyethylene resins, a combination of a polypropylene resin and a polyethylene resin, a combination of a polypropylene resin and a thermoplastic elastomer (particularly an olefin thermoplastic elastomer), and a combination of a polypropylene resin and a thermoplastic resin (e.g., polyamide and polycarbonate).

Generally, advantages of laser welding include increased degrees of freedom for the shapes of the molds for the molded resin products of laser ray transmitting material and laser ray absorbing material to be welded because of the capability of 3-dimensional welding, improved appearance because of freedom from burrs on the welded surface unlike in vibration welding, and applicability to electronic components because of freedom from vibration and wear dust. Conversely, its disadvantages include the necessity of pre-investment in equipment known as laser welding machine, and possible gap formation between the parts for welding, due to sink during the molding of the laser ray transmitting material and laser ray absorbing material to be welded, both of which are made of resin. The problem with this gap, in particular, is of greatest concern in performing laser welding; there are many cases where a jig for fixture such as a clamp is made on a case-by-case basis to adapt it to the shapes of the parts to be welded. It is known that if a gap of 0.02 mm occurs, welding strength halves compared to the gap-free state, and that welding fails if the gap is 0.05 mm or more.

Available laser welding machines include the scanning type, in which laser moves, the masking type, in which the parts to be welded move, and the type in which laser rays are irradiated to the parts to be welded from multiple directions simultaneously. It is the scanning type which is drawing attention from the automobile industry, with a scanning speed of 5 m/min serving as the criterion for production tact time.

Because laser welding relies on the conversion of light energy of laser to heat energy, welding performance is considerably influenced by laser welding conditions. Generally, the amount of heat produced by irradiated laser on the absorbent part surface can be calculated by the equation below:

Amount of heat on absorbent part surface $(J/mm^2)$
  =laser output $(W)$/[scanning speed (mm/sec)×ray spot diameter of laser (mm)]

To increase production efficiency, the scanning speed must be increased; to achieve this, a laser welding machine of the high output type is necessary.

Additionally, to increase welding strength, some heat on the surface of the laser absorbing part is necessary. This heat must be determined by combining various conditions such as increased output setting, decreased scanning speed, and decreased spot diameter. Since too great surface heat provided by laser affects the appearance of the welded portion and, in the extreme case, causes the laser absorbing part to smoke, laser welding condition settings are important and the laser transmittance of the laser ray transmitting resin material to be welded is of paramount importance. Considering the above-described conditions, it is preferable that in the method of laser welding of the present invention, a contact portion of a laser ray transmitting material and a laser ray absorbing material be welded in a state that satisfies Formula (A). By doing so, a welded product having a practically unproblematic welding strength is obtained.

$$Q=P/(S\cdot\phi)<0.4 \quad (A)$$

Where

Q: amount of heat on surface of laser ray absorbing material (J/m×n2)

P: output (W) of laser that laser ray transmitting material transmits

S: laser scanning speed (mm/sec)

φ: spot diameter of laser (mm).

It is preferable that the laser ray absorbing material comprise a laser ray absorbing colored resin composition incorporating carbon black and/or another laser ray absorbent, for example, as a laser ray absorbing black colorant.

As substances that can be used as both the aforementioned black colorant and laser ray absorbent, there may be mentioned carbon black, nigrosine, aniline black and so on. As examples of other laser ray absorbents, there may be mentioned phthalocyanine, naphthalocyanine, perilene, quaterylene, metal complexes, squaric acid derivatives, immonium dyes, polymethine, etc.;

two or more thereof may be blended to obtain a black laser ray absorbent. Furthermore, it is also possible to use the aforementioned laser ray transmitting colorant and laser ray absorbent in combination. A preferred laser absorbing black colorant is a combination of carbon black and nigrosine.

As the carbon black with good laser absorbability, there may be mentioned those 15 to 100 nm (preferably 15 to 50 nm) in primary particle diameter, and those 30 to 500 m²/g (preferably 100 to 300 m²/g) in BET specific surface area.

The amount of colorant used in such a laser ray absorbing colored resin composition may be, for example, 0.01 to 10% by weight relative to polyolefin resin, and is preferably 0.05 to 5% by weight. The laser ray absorbing material can be produced in the same manner as the laser ray transmitting material except for the containment of a laser ray absorbent.

As examples of major applications of the laser ray transmitting colored polyolefin resin composition and method of laser welding of the present invention, there may be mentioned automobile parts. More specifically, there may be mentioned, for example, instrument panels in interiors and resonators (mufflers) in engine rooms. Conventionally, use of adhesives has been difficult in joining polyolefin resin parts; to achieve their joining, special procedures such as surface treatment have been necessary. When laser welding is used, there is no need for pretreatment, alloying of resin and the like; laser welding can be said to surpass adhesives also in terms of strength and recyclability.

EXAMPLES

The present invention is hereinafter described in more detail by means of, but is not limited to, the following examples.

Referring to Table 3, the colorants prepared in Production Examples 1 to 8 were used in the respective Examples, and the colorants prepared in Comparative Production Examples 1 to 8 were used in the respective Comparative Examples. All these colorants were single salt forming dyes or mixed dyes of two or more kinds of salt forming dyes. The anionic components shown as the Example Compounds above correspond to the acid dyes for the respective Production Examples, and the organic ammonium components shown in Table 1 or 2 correspond to the organic amines for the respective Production Examples. The salt forming dyes of each of C.I. Acid Red 266 (monoazo acid dye), C.I. Acid Yellow 49 (monoazo acid dye), C.I. Acid Red 143 (anthrapyridone acid dye), C.I. Acid Red 97 (disazo acid dye), C.I. Acid Red 144 (disazo acid dye), C.I. Acid Yellow 42 (monoazo acid dye), C.I. Acid Violet 43 (anthraquinone acid dye), C.I. Acid Blue 41 (anthraquinone acid dye), C.I. Acid Blue 62 (anthraquinone acid dye) and C.I. Acid Blue 260 (anthraquinone acid dye) and each organic amine in Production Examples 4 to 8 and Comparative Production Examples 1 to 8 were obtained by a salt-forming reaction of each acid dye and each organic amine.

Each of the colorants of Production Examples 1 to 3 and Comparative Production Examples 1 to 4 comprises a single salt forming dye, whereas the colorants of Production Examples 4 to 8 and Comparative Production Examples 5 to 8 are black colorants prepared by blending a plurality of salt forming dyes according to the respective content ratios by weight shown in the content ratio column using a simple mechanical mixer.

For example, the colorant of Production Example 1 was produced as described below. First, 10 g of an anthraquinone acid dye represented by Example Compound (1)-1 was dispersed in 500 ml of water. Separately, 5 mg of hydrochloric acid and 7 g of the organic amine S-4 were dissolved in 150 ml of water. This solution was added drop by drop to the dispersion liquid of said anthraquinone acid dye at room temperature, and the reaction was carried out with stirring at 40 to 45° C. for 1 hour. Subsequently, the temperature was increased to 60 to 70° C. to make the reaction product particulate, and the reaction mixture was adjusted to a pH of 6.5 to 7.5 and stirred for 1 hour. The reaction mixture was filtered and the cake filtered out was washed with water, to yield 12.0 g (yield 75%) of an anthraquinone salt forming dye.

TABLE 3

|  | Acid dye | Organic amine | Content ratio |
|---|---|---|---|
| Production Example 1 | Example Compound (1)-1 | S-4 | — |
| Production Example 2 | Example Compound (1)-2 | S-4 | — |
| Production Example 3 | Example Compound (1)-4 | S-4 | — |
| Production Example 4 | Example Compound (1)-1 | S-4 | 5 |
|  | C.I. Acid Red 266 | S-4 | 3 |
|  | C.I. Acid Yellow 49 | S-4 | 2 |
| Production Example 5 | Example Compound (1)-2 | S-4 | 2 |
|  | C.I. Acid Red 143 | S-4 | 1 |
| Production Example 6 | Example Compound (1)-3 | S-4 | 1 |
|  | C.I. Acid Red 97 | S-5 | 1 |
| Production Example 7 | Example Compound (1)-1 | S-4 | 2 |
|  | C.I. Acid Red 144 | S-4 | 2 |
|  | C.I. Acid Yellow 42 | S-1 | 3 |

TABLE 3-continued

| | Acid dye | Organic amine | Content ratio |
|---|---|---|---|
| Production Example 8 | Example Compound (1)-4 | S-4 | 5 |
| | C.I. Acid Yellow 42 | S-4 | 1 |
| Comparative Production Example 1 | C.I. Acid Violet 43 | S-4 | — |
| Comparative Production Example 2 | C.I. Acid Blue 41 | S-4 | — |
| Comparative Production Example 3 | C.I. Acid Blue 62 | S-4 | — |
| Comparative Production Example 4 | C.I. Acid Blue 260 | S-4 | — |
| Comparative Production Example 5 | C.I. Acid Blue 62 | S-4 | 5 |
| | C.I. Acid Red 266 | S-4 | 2 |
| | C.I. Acid Yellow 42 | S-4 | 1 |
| Comparative Production Example 6 | C.I. Acid Violet 43 | S-4 | 3 |
| | C.I. Acid Yellow 49 | S-4 | 1 |
| Comparative Production Example 7 | C.I. Acid Blue 41 | S-3 | 5 |
| | C.I. Acid Red 266 | S-3 | 3 |
| | C.I. Acid Yellow 49 | S-3 | 2 |
| Comparative Production Example 8 | C.I. Acid Blue 260 | S-4 | 5 |
| | C.I. Acid Red 266 | S-4 | 3 |
| | C.I. Acid Yellow 42 | S-4 | 2 |

Example 1

Fiber-Reinforced polypropylene Resin . . . 400 g (manufactured by Japan Polychem, Product Number: HG30U)

Colorant of Production Example 1 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored blue test piece having good appearance and surface gloss was obtained.

Example 2

Fiber-Reinforced polypropylene Resin . . . 400 g (Manufactured by Japan Polychem, Product Number: HG30U)

Colorant of Production Example 2 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored green test piece having good appearance and surface gloss was obtained.

Example 3

Fiber-Reinforced polypropylene Resin . . . 400 g (Manufactured by Japan Polychem, Product Number: HG30U)

Colorant of Production Example 3 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored purple test piece having good appearance and surface gloss was obtained.

Example 4

Fiber-Reinforced polypropylene Resin . . . 400 g (Manufactured by Japan Polychem, Product Number: HG30U)

Colorant of Production Example 4 . . . 1.20 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored black test piece having good appearance and surface gloss was obtained.

Example 5

Fiber-Reinforced polypropylene Resin . . . 400 g (Manufactured by Japan Polychem, Product Number: HG30U)

Colorant of Production Example 5 . . . 1.20 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored black test piece having good appearance and surface gloss was obtained.

Example 6

Fiber-Reinforced polypropylene Resin . . . 400 g (Manufactured by Japan Polychem, Product Number: HG30U)

Colorant of Production Example 6 . . . 1.20 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored black test piece having good appearance and surface gloss was obtained.

Example 7

Fiber-Reinforced polypropylene Resin . . . 400 g (Manufactured by Japan Polychem, Product Number: HG30U)

Colorant of Production Example 7 . . . 1.20 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored black test piece having good appearance and surface gloss was obtained.

Example 8

Fiber-Reinforced polypropylene Resin . . . 400 g (Manufactured by Japan Polychem, Product Number: HG30U)

Colorant of Production Example 8 . . . 1.20 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored black test piece having good appearance and surface gloss was obtained.

Example 9

Polypropylene Resin (Not Reinforced) . . . 900 g (Manufactured by Japan Polychem, Product Number: BC05B)

Colorant of Production Example 8 . . . 100 g

The above ingredients were placed in a stainless steel tumbler and mixed with stirring for 1 hour. The blend obtained was mixed in a molten state at a cylinder temperature of 220° C. using a single-shaft extruder (manufactured by Enpura Sangyo, product number: E30SV). Subsequently, it was cooled in a water chamber and then cut using a pelletizer and subjected to a drying process to yield a black master batch.

Fiber-Reinforced polypropylene Resin . . . 384 g (Manufactured by Japan Polychem, Product Number: HG30U)

Black Master Batch . . . 12 g

The above ingredients were placed in a stainless steel tumbler and mixed with stirring for 20 minutes. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored black test piece having good appearance and surface gloss was obtained.

Example 10

Low-Density polyethylene Resin . . . 400 g (Manufactured by Japan Polychem, Product Number: LC604)

Colorant of Production Example 8 . . . 1.20 g

The above ingredients were placed in a stainless steel tumbler and mixed with stirring for 1 hour. The blend obtained was injection-molded by an ordinary method at a cylinder temperature of 180° C. and a mold temperature of 40° C. using an injection molding machine (manufactured by Toyo Machinery & Metal Co., Ltd., product number: Si-50); a uniformly colored black test piece having good appearance and surface gloss was obtained.

Example 11 lp;-.5pHigh-Density polyethylene Resin . . . 400 g (Manufactured by Japan Polychem, Product Number: HJ290)

Colorant of Production Example 8 . . . 1.20 g

The above ingredients were placed in a stainless steel tumbler and mixed with stirring for 1 hour. The blend obtained was injection-molded by an ordinary method at a cylinder temperature of 210° C. and a mold temperature of 40° C. using an injection molding machine (manufactured by Toyo Machinery & Metal Co., Ltd., product number: Si-50); a uniformly colored black test piece having good appearance and surface gloss was obtained.

Example 12

Polyolefin Cross-Linked Thermoplastic Elastomer . . . 400 g (Manufactured by Advanced Elastomer Systems Japan, Product Cumber: Santoprene 8211-65)

Colorant of Production Example 1 . . . 0.40 g

The above ingredients were placed in a stainless steel tumbler and mixed with stirring for 1 hour. The blend obtained was injection-molded by an ordinary method at a cylinder temperature of 200° C. and a mold temperature of 40° C. using an injection molding machine (manufactured by Toyo Machinery & Metal Co., Ltd., product number: Si-50); a uniformly colored blue test piece having good appearance and surface gloss was obtained.

Example 13

Polypropylene Resin (Not Reinforced) . . . 790 g (Manufactured by Japan Polychem, Product Number: BC05B)

Colorant of Production Example 8 . . . 10 g

Talc . . . 200 g

The above ingredients were mixed with stirring in a high-speed mixer for 20 minutes. The blend obtained was mixed in a molten state at a cylinder temperature of 220° C. using a single-shaft extruder (manufactured by Enpura Sangyo, product number: E30SV). Subsequently, it was cooled in a water chamber and then cut using a pelletizer and subjected to a drying process to yield black pellets.

Subsequently, they were injection-molded by an ordinary method at a cylinder temperature of 200° C. and a mold temperature of 40° C. using an injection molding machine (manufactured by Toyo Machinery & Metal Co., Ltd., product number: Si-50); a uniformly colored black test piece having good appearance and surface gloss was obtained.

Comparative Example 1

Fiber-Reinforced polypropylene Resin . . . 400 g (Manufactured by Japan Polychem, Product Number: HG30U)

Colorant of Comparative Production Example 1 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a purple test piece was obtained.

Comparative Example 2

Fiber-Reinforced polypropylene Resin . . . 400 g (Manufactured by Japan Polychem, Product Number: HG30U)

Colorant of Comparative Production Example 2 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a blue test piece was obtained.

Comparative Example 3

Fiber-Reinforced polypropylene Resin . . . 400 g (Manufactured by Japan Polychem, Product Number: HG30U)

Colorant of Comparative Production Example 3 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C.

using an injection molding machine (manufactured by Toyo Machinery & Metal Co., Ltd., product number: Si-50); a blue test piece was obtained.

Comparative Example 4

Fiber-Reinforced polypropylene Resin . . . 400 g (Manufactured by Japan Polychem, Product Number: HG30U)

Colorant of Comparative Production Example 4 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a blue test piece was obtained.

Comparative Example 5

Fiber-Reinforced polypropylene Resin . . . 400 g (Manufactured by Japan Polychem, Product Number: HG30U)

Colorant of Comparative Production Example 5 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a black test piece was obtained.

Comparative Example 6

Fiber-Reinforced polypropylene Resin . . . 400 g (Manufactured by Japan Polychem, Product Number: HG30U)

Colorant of Comparative Production Example 6 . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a black test piece was obtained.

Comparative Example 7

Fiber-Reinforced polypropylene Resin . . . 400 g (Manufactured by Japan Polychem, Product Number: HG30U)

Colorant of Comparative Production Example 7 . . . 1.20 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a black test piece was obtained.

Comparative Example 8

Fiber-Reinforced polypropylene Resin . . . 400 g (Manufactured by Japan Polychem, Product Number: HG30U)

Colorant of Comparative Production Example 8 . . . 1.20 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a black test piece was obtained.

Physical Property Assessments

The laser ray transmitting colored polyolefin resin compositions obtained in Examples 1 to 8 and Comparative Examples 1 to 8 and similarly molded uncolored polyolefin resin (PP) test pieces were subjected to physical property assessments by the methods described below. The results are shown in Tables 4 and 5 below.

(1) Determination of Transmittance

Each test piece was set to a spectrophotometer (manufactured by JASCO Corporation, product number: V-570 model), and its transmittance was determined over a wavelength range of $\lambda$=400 to 1200 nm. Tables 4 and 5 show the transmittances of respective test pieces for semiconductor laser ray at a wavelength of 940 nm.

(2) Anti-Sublimation Test and Assessment

A test piece with a white PET (polyethylene terephthalate resin) film applied thereto was placed in an oven and allowed to stand at 160° C. for 3 hours. Thereafter, the PET film was removed from the test piece and applied to a colorless transparent OHP (overhead projector) sheet to facilitate observation. If the dye had not migrated to the PET film, the dye was judged to have anti-sublimation quality.

(3) Heat Resistance Test and Assessment

In the injection molding in Examples 1 to 8 and Comparative Examples 1 to 8 above, a blend of ingredients was subjected to an ordinary shot, and thereafter the remaining portion of the blend was retained in the cylinder at 220° C. for 15 minutes; injection molding was then conducted to yield test pieces.

If the discoloration/fading of the color of the test piece obtained after the retainment in the cylinder for 15 minutes had not advanced compared to the color of the test piece obtained by an ordinary shot, it was judged to be resistant to heat.

(4) Anti-Bleeding Test and Assessment

Each of the test pieces obtained in Examples 1 to 8 and Comparative Examples 1 to 8 above and a white test piece colored with titanium oxide were superposed in the direction of thickness, and was allowed to stand at 80° C. for 100 hours under a pressure of 200 g (1.96 N)/cm$^2$ exerted in the direction of superposition. Subsequently, degree of colorant migration to the white test piece was examined. If the colorant had not migrated to the white test piece, the test piece was judged to have anti-bleeding quality.

(5) Preparation of Laser Absorbing Test Pieces for Laser Welding Test and Laser Welding Test laser absorbing test pieces (laser ray absorbing materials) incorporating a polyolefin resin were prepared as described below.

Fiber-Reinforced polypropylene Resin . . . 400 g (Manufactured by Japan Polychem, Product Number: HG30U)

Carbon Black . . . 0.80 g

The above ingredients were placed in a stainless steel tumbler and mixed with stirring for 1 hour. The blend obtained was injection-molded by an ordinary method at a cylinder temperature of 220° C. and a mold temperature of 40° C. using an injection molding machine (manufactured by Toyo Machinery & Metal Co., Ltd., product number: Si-50); a uniformly colored black laser absorbing test piece having good appearance and surface gloss was obtained.

Low-density polyethylene Resin . . . 400 g (Manufactured by Japan Polychem, Product Number: LC604)

Carbon Black . . . 0.80 g

The above ingredients were placed in a stainless steel tumbler and mixed with stirring for 1 hour. The blend obtained was injection-molded by an ordinary method at a cylinder temperature of 180° C. and a mold temperature of 40° C. using an injection molding machine (manufactured by Toyo Machinery & Metal Co., Ltd., product number: Si-50); a uniformly colored black test piece having good appearance and surface gloss was obtained.

High-density polyethylene Resin . . . 400 g (Manufactured by Japan Polychem, Product Number: HJ290)

Carbon Black . . . 0.80 g

The above ingredients were placed in a stainless steel tumbler and mixed with stirring for 1 hour. The blend obtained was injection-molded by an ordinary method at a cylinder temperature of 210° C. and a mold temperature of 40° C. using an injection molding machine (manufactured by Toyo Machinery & Metal Co., Ltd., product number: Si-50); a uniformly colored black test piece having good appearance and surface gloss was obtained.

Polyolefin Cross-Linked Thermoplastic Elastomer . . . 400 g (Manufactured by Advanced Elastomer Systems Japan, Product Number: Santoprene 8211-65)

Carbon Black . . . 0.40 g

The above ingredients were placed in a stainless steel tumbler and mixed with stirring for 1 hour. The blend obtained was injection-molded by an ordinary method at a cylinder temperature of 200° C. and a mold temperature of 40° C. using an injection molding machine (manufactured by Toyo Machinery & Metal Co., Ltd., product number: Si-50); a uniformly colored black test piece having good appearance and surface gloss was obtained.

Talc-Containing polypropylene Resin . . . 400 g

Carbon Black . . . 2.00 g

The above ingredients were placed in a stainless steel tumbler and mixed with stirring for 1 hour. The blend obtained was injection-molded by an ordinary method at a cylinder temperature of 200° C. and a mold temperature of 40° C. using an injection molding machine (manufactured by Toyo Machinery & Metal Co., Ltd., product number: Si-50); a uniformly colored black test piece having good appearance and surface gloss was obtained As shown in FIG. 1 (lateral view) and FIG. 2 (oblique view), each test piece 10 of Examples 1 to 11 and Comparative Examples 1 to 8 and the laser absorbing test piece 12 [all 60 mm length×18 mm width×3 mm thickness (1.5 mm thickness for 20 mm of the length)], were superposed with respective portions 20 mm length×18 mm width×1.5 mm thickness in contact with each other.

The superposed portion was irradiated with a laser beam 14 (spot diameter 0.6 mm) from above the test piece 10 (in the Figure) using a diode laser of 30 W output [wavelength: 940 nm, continuous] (manufactured by Fine Devices Company), while scanning at a variable scanning speed in the lateral direction (direction perpendicular to the plane of FIG. 1). Welding was conducted between test pieces of the same material.

Figure 2:
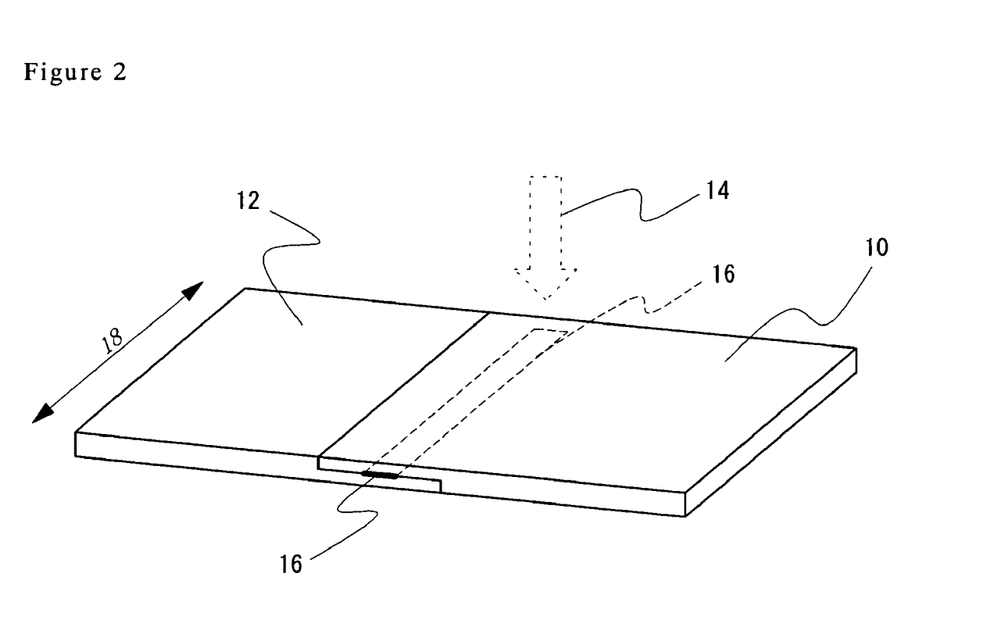
FIG. 2 is an oblique view of the laser welding test.

If the test piece 10 transmits the laser and the laser is absorbed in the laser absorbing test piece 12, the laser absorbing test piece 12 would generate heat, by which heat the laser absorbing test piece 12 is molten around the portion that has absorbed the laser ray, and the test piece 10 is also molten, the resins of the two test pieces fuse together, and upon cooling the two pieces are joined together. In FIG. 2, 16 indicates the welded portion.

The welded product obtained in (5) above was subjected to a tensile strength test on both the test piece 10 side and the laser absorbing test piece 12 side in the longitudinal direction (left-right direction in FIG. 1) at a pulling speed of 10 mm/min in accordance with JIS K7113-1995 using a tensile strength tester (AG-50kNE, manufactured by Shimadzu Corporation), in order to determine its tensile welding strength.

In Tables 4 and 5, Examples 1 to 8 describe the results for polypropylenes, Example 9 for a low-density polyethylene (LDPE), Example 10 for a high-density polyethylene (HDPE), and Example 11 for a thermoplastic elastomer (elastomer).

TABLE 4

| | (1) Transmittance test (%) | (2) Anti-sublimation test | (3) Heat resistance test | (4) Anti-bleeding test | (5) Laser welding test ||| (6) Tensile strength test |
|---|---|---|---|---|---|---|---|---|
| | | | | | Scanning speed (mm/sec) | Surface heat (J/mm²) | Welding state appearance | Tensile strength (Mpa) |
| GF-PP | 48 | — | — | — | | | | |
| Example 1 | 46 | Good | Good | Good | 30 | 0.77 | No problem | 14.8 |
| | | | | | 45 | 0.51 | No problem | 11.1 |
| | | | | | 60 | 0.38 | No problem | 3.7 |
| Example 2 | 45 | Good | Good | Good | 30 | 0.75 | No problem | 14.2 |
| | | | | | 45 | 0.50 | No problem | 10.0 |
| | | | | | 60 | 0.37 | No problem | 2.5 |
| Example 3 | 45 | Good | Good | Good | 30 | 0.75 | No problem | 14.5 |
| | | | | | 45 | 0.50 | No problem | 10.7 |
| | | | | | 60 | 0.37 | No problem | 3.2 |
| Example 4 | 45 | Good | Good | Good | 30 | 0.75 | No problem | 14.1 |
| | | | | | 45 | 0.50 | No problem | 10.3 |
| | | | | | 60 | 0.37 | No problem | 2.9 |
| Example 5 | 44 | Good | Good | Good | 30 | 0.73 | No problem | 13.5 |
| | | | | | 45 | 0.48 | No problem | 11.2 |
| | | | | | 60 | 0.36 | No problem | 3.0 |

TABLE 4-continued

|  | (1) Transmittance test (%) | (2) Anti-sublimation test | (3) Heat resistance test | (4) Anti-bleeding test | (5) Laser welding test ||| (6) Tensile strength test |
|---|---|---|---|---|---|---|---|---|
|  |  |  |  |  | Scanning speed (mm/sec) | Surface heat (J/mm²) | Welding state appearance | Tensile strength (Mpa) |
| Example 6 | 44 | Good | Good | Good | 30 | 0.73 | No problem | 14.0 |
|  |  |  |  |  | 45 | 0.48 | No problem | 10.8 |
|  |  |  |  |  | 60 | 0.36 | No problem | 3.7 |
| Example 7 | 45 | Good | Good | Good | 30 | 0.75 | No problem | 14.8 |
|  |  |  |  |  | 45 | 0.50 | No problem | 10.6 |
|  |  |  |  |  | 60 | 0.37 | No problem | 3.0 |
| Example 8 | 44 | Good | Good | Good | 30 | 0.73 | No problem | 14.2 |
|  |  |  |  |  | 45 | 0.48 | No problem | 11.4 |
|  |  |  |  |  | 60 | 0.36 | No problem | 3.6 |
| Example 9 | 47 | Good | Good | Good | 30 | 0.78 | No problem | 15.7 |
|  |  |  |  |  | 45 | 0.52 | No problem | 12.3 |
|  |  |  |  |  | 60 | 0.39 | No problem | 5.8 |
| LDPE | 58 | — | — | — |  |  |  |  |
| Example 10 | 53 | Good | Good | Good | 30 | 0.88 | No problem | 18.1 |
|  |  |  |  |  | 45 | 0.59 | No problem | 17.2 |
|  |  |  |  |  | 60 | 0.44 | No problem | 15.7 |
| HDPE | 54 | — | — | — |  |  |  |  |
| Example 11 | 49 | Good | Good | Good | 30 | 0.82 | No problem | 19.5 |
|  |  |  |  |  | 45 | 0.54 | No problem | 18.6 |
|  |  |  |  |  | 60 | 0.40 | No problem | 15.1 |
| Elastomer | 41 | — | — | — |  |  |  |  |
| Example 12 | 33 | Good | Good | Good | 10 | 1.55 | No problem | 1.1 |
|  |  |  |  |  | 15 | 1.03 | No problem | 0.9 |
| Talc PP | 30 | — | — | — |  |  |  |  |
| Example 13 | 26 | Good | Good | Good | 10 | 1.30 | No problem | 13.4 |

TABLE 5

|  | (1) Transmittance test (%) | (2) Anti-sublimation test | (3) Heat resistance test | (4) Anti-bleeding test | (5) Laser welding test ||| (6) Tensile strength test |
|---|---|---|---|---|---|---|---|---|
|  |  |  |  |  | Scanning speed (mm/sec) | Surface heat (J/mm²) | Welding state appearance | Tensile strength (Mpa) |
| Comparative Example 1 | 46 | Unacceptable | Good | Good | 30 | 0.77 | No problem | 14.5 |
|  |  |  |  |  | 45 | 0.51 | No problem | 12.3 |
|  |  |  |  |  | 60 | 0.38 | No problem | 3.3 |
| Comparative Example 2 | 43 | Unacceptable | Good | Good | 30 | 0.71 | No problem | 13.2 |
|  |  |  |  |  | 45 | 0.47 | No problem | 11.4 |
|  |  |  |  |  | 60 | 0.35 | No problem | 1.8 |
| Comparative Example 3 | 46 | Unacceptable | Good | Unacceptable | 30 | 0.77 | No problem | 13.9 |
|  |  |  |  |  | 45 | 0.51 | No problem | 11.9 |
|  |  |  |  |  | 60 | 0.38 | No problem | 3.5 |
| Comparative Example 4 | 44 | Unacceptable | Good | Good | 30 | 0.73 | No problem | 13.8 |
|  |  |  |  |  | 45 | 0.48 | No problem | 11.6 |
|  |  |  |  |  | 60 | 0.36 | No problem | 2.8 |
| Comparative Example 5 | 47 | Unacceptable | Good | Unacceptable | 30 | 0.78 | No problem | 14.8 |
|  |  |  |  |  | 45 | 0.52 | No problem | 12.0 |
|  |  |  |  |  | 60 | 0.39 | No problem | 3.6 |
| Comparative Example 6 | 45 | Unacceptable | Good | Good | 30 | 0.75 | No problem | 14.7 |
|  |  |  |  |  | 45 | 0.50 | No problem | 11.4 |
|  |  |  |  |  | 60 | 0.37 | No problem | 3.9 |
| Comparative Example 7 | 43 | Unacceptable | Good | Good | 30 | 0.71 | No problem | 13.0 |
|  |  |  |  |  | 45 | 0.47 | No problem | 10.1 |
|  |  |  |  |  | 60 | 0.35 | No problem | 2.1 |
| Comparative Example 8 | 43 | Unacceptable | Good | Good | 30 | 0.71 | No problem | 13.4 |
|  |  |  |  |  | 45 | 0.47 | No problem | 10.6 |
|  |  |  |  |  | 60 | 0.35 | No problem | 1.9 |

The colored polyolefin resin compositions of the Comparative Examples were all judged to be unacceptable in the anti-sublimation test. The colored polyoferin resin compositions of Comparative Examples 3 and 5 were also judged to be unacceptable in the anti-bleeding test.

The invention claimed is:
1. A laser ray transmitting colored polyolefin resin composition containing an anthraquinone salt forming dye represented by Formula (1) below and a red azo salt forming dye the anionic component of which corresponds to a red azo acid dye selected from the group consisting of the dyes as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 144, 148, 150, 151, 176, 231, and 266, the polyolefin resin composition containing 5 to 50% by weight of talc relative to said polyolefin resin:

(1)

in Formula (1),
each of A and B independently represents —NH— or —O—,
each of $R^1$ to $R^3$ independently represents hydrogen, an amino group, a hydroxy group or a halogen,
each of $R^4$ to $R^{13}$ independently represents hydrogen, an alkyl group, a nitro group or a sulfonic group,
$Ki^{n+}$ represents an organic ammonium ion,
m represents 1 or 2, and
n represents 1 or 2;
the sulfonic group is —$SO_3$ or $SO_3M$, the number of —$SO_3$ being m, M representing hydrogen or an alkali metal, and each of M may be identical or not provided that the number of $SO_3M$ is 2 or more.

2. Laser ray transmitting colored polyolefin resin composition of claim 1, which contains 10 to 40% by weight of the talc relative to said polyolefin resin.

3. Laser ray transmitting colored polyolefin resin composition of claim 1, wherein said polyolefin resin is polypropylene resin.

4. A method of laser welding comprising welding a portion of contact of a laser ray transmitting material comprising a laser ray transmitting colored polyolefin resin composition containing an anthraquinone salt forming dye represented by Formula (1) below and a red azo salt forming dye the anionic component of which corresponds to a red azo acid dye selected from the group consisting of the dyes as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 144, 148, 150, 151, 176, 231, and 266, the polyolefin resin composition containing 5 to 50% by weight of talc relative to said polyolefin resin, and a laser ray absorbing material by irradiating laser ray so that the laser ray transmitting material transmits the laser ray and the laser ray is absorbed in the laser ray absorbing material with the laser ray transmitting material and the laser ray absorbing material in contact with each other:

(1)

in Formula (1),
each of A and B independently represents —NH— or —O—,
each of $R^1$ to $R^3$ independently represents hydrogen, an amino group, a hydroxy group or a halogen,
each of $R^1$ to $R^{13}$ independently represents hydrogen, an alkyl group, a nitro group or a sulfonic group,
$Ki^{n+}$ represents an organic ammonium ion,
m represents 1 or 2, and
n represents 1 or 2;
the sulfonic group is —$SO_3$ or $SO_3M$, the number of —$SO_3$ being m, M representing hydrogen or an alkali metal, and each of M may be identical or not provided that the number of $SO_3M$ is 2 or more.

5. Method of laser welding of claim 4, wherein said polyolefin resin is polypropylene resin and the laser ray absorbing material comprises a laser ray absorbing colored resin composition incorporating carbon black and/or another laser absorbing colorant.

6. Method of laser welding of claim 4, wherein a contact portion of the laser ray transmitting material and the laser ray absorbing material is welded in a state that satisfies Formula (A):

$$Q=P/(S\cdot\phi)>0.4 \quad (A)$$

where
Q: amount of heat on surface of laser ray absorbing material (J/mm$^2$)
P: output (W) of laser that laser ray transmitting material transmits
S: laser scanning speed (mm/sec)
φ: spot diameter of laser (mm).

7. A laser ray transmitting colored polyolefin resin composition containing an anthraquinone salt forming dye represented by Formula (1) below and a red azo salt forming dye the anionic component of which corresponds to a red azo acid dye selected from the group consisting of the dyes as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 144, 148, 150, 151, 176, 231, and 266, said polyolefin resin being a polyolefin elastomer:

in Formula (1),
each of A and B independently represents —NH— or —O—,
each of $R^1$ to $R^3$ independently represents hydrogen, an amino group, a hydroxy group or a halogen,
each of $R^1$ to $R^{13}$ independently represents hydrogen, an alkyl group, a nitro group or a sulfonic group,
$K_i^{n+}$ represents an organic ammonium ion,
m represents 1 or 2, and
n represents 1 or 2;
the sulfonic group is —$SO_3$ or $SO_3M$, the number of —$SO_3$ being m, M representing hydrogen or an alkali metal, and each of M may be identical or not provided that the number of $SO_3M$ is 2 or more.

8. A method of laser welding comprising welding a portion of contact of a laser ray transmitting material comprising a laser ray transmitting colored polyolefin resin composition containing an anthraquinone salt forming dye represented by Formula (1) below and a red azo salt forming dye the anionic component of which corresponds to a red azo acid dye selected from the group consisting of the dyes as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 144, 148, 150, 151, 176, 231, and 266, said polyolefin resin being a polyolefin elastomer, and a laser ray absorbing material by irradiating laser ray so that the laser ray transmitting material transmits the laser ray and the laser ray is absorbed in the laser ray absorbing material with the laser ray transmitting material and the laser ray absorbing material in contact with each other:

in Formula (1),
each of A and B independently represents —NH— or —O—,
each of $R^1$ to $R^3$ independently represents hydrogen, an amino group, a hydroxy group or a halogen,
each of $R^4$ to $R^{13}$ independently represents hydrogen, an alkyl group, a nitro group or a sulfonic group,
$K_i^{n+}$ represents an organic ammonium ion,
m represents 1 or 2, and
n represents 1 or 2;
the sulfonic group is —$SO_3$ or $SO_3M$, the number of —$SO_3$ being m, M representing hydrogen or an alkali metal, and each of M may be identical or not provided that the number of $SO_3M$ is 2 or more.

9. Method of laser welding of claim 8, wherein said polyolefin elastomer is polypropylene elastomer and the laser ray absorbing material comprises a laser ray absorbing colored resin composition incorporating carbon black and/or another laser absorbing colorant.

10. Method of laser welding of claim 8, wherein the laser ray absorbing material comprises a laser ray absorbing colored resin composition incorporating carbon black and/or another laser absorbing colorant.

11. Method of laser welding of claim 8, wherein a contact portion of the laser ray transmitting material and the laser ray absorbing material is welded in a state that satisfies Formula (A):

$$Q = P/(S \cdot \phi) > 0.4 \quad (A)$$

where
Q: amount of heat on surface of laser ray absorbing material ($J/mm^2$)
P: output (W) of laser that laser ray transmitting material transmits
S: laser scanning speed (mm/sec)
$\phi$: spot diameter of laser (mm).

12. A method of laser welding comprising welding a portion of contact of a laser ray transmitting material comprising a laser ray transmitting colored polypropylene resin composition containing an anthraquinone salt forming dye represented by Formula (1) below and a red azo salt forming dye the anionic component of which corresponds to a red azo acid dye selected from the group consisting of the dyes as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 144, 148, 150, 151, 176, 231, and 266, the polypropylene resin composition containing 5 to 120% by weight of reinforcing glass fiber relative to said polypropylene resin, and a laser ray absorbing material by irradiating laser ray so that the laser ray transmitting material transmits the laser ray and the laser ray is absorbed in the laser ray absorbing material with the laser ray transmitting material and the laser ray absorbing material in contact with each other:

$$\left[ \begin{array}{c} \text{structure with } R^1, R^2, R^3 \text{ on anthraquinone core with two C=O groups, linked via A to phenyl ring bearing } R^4, R^5, R^6, R^7, R^8, \text{ and via B to phenyl ring bearing } R^9, R^{10}, R^{11}, R^{12}, R^{13} \end{array} \right]_m^{m^-} \cdot m/n(K_i^{n+}) \qquad (1)$$

in Formula (1),
each of A and B independently represents —NH— or —O—,
each of $R^1$ to $R^3$ independently represents hydrogen, an amino group, a hydroxy group or a halogen,
each of $R^4$ to $R^{13}$ independently represents hydrogen, an alkyl group, a nitro group or a sulfonic group,
$K_i^{n+}$ represents an organic ammonium ion,
m represents 1 or 2, and
n represents 1 or 2;
the sulfonic group is —SO$_3$ or SO$_3$M, the number of —SO$_3$ being m, M representing hydrogen or an alkali metal, and each of M may be identical or not provided that the number of SO$_3$M is 2 or more.

13. Method of laser welding of claim 12, wherein the laser ray absorbing material comprises a laser ray absorbing colored resin composition incorporating carbon black and/or another laser absorbing colorant.

14. Method of laser welding of claim 12, wherein the laser ray absorbing material comprises a laser ray absorbing colored resin composition incorporating carbon black, the primary particle diameter of said carbon black being 15 to 50 nm.

15. Method of laser welding of claim 12, wherein a contact portion of the laser ray transmitting material and the laser ray absorbing material is welded in a state that satisfies Formula (A):

$$Q=P/(S\cdot\phi)>0.4$$

where
Q: amount of heat on surface of laser ray absorbing material (J/mm$^2$)
P: output (W) of laser that laser ray transmitting material transmits
S: laser scanning speed (mm/sec)
$\phi$: spot diameter of laser (mm).

16. A method of laser welding comprising welding a portion of contact of a laser ray transmitting material comprising a polyolefin resin composition containing an anthraquinone salt forming dye represented by Formula (1) below and a red azo salt forming dye the anionic component of which corresponds to a red azo acid dye selected from the group consisting of the dyes as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 144, 148, 150, 151, 176, 231, and 266, and a laser ray absorbing material comprising a laser ray absorbing colored resin composition incorporating carbon black and/or another laser absorbing colorant in a state that satisfies Formula (A) below by irradiating laser ray so that the laser ray transmitting material transmits the laser ray and the laser ray is absorbed in the laser ray absorbing material with the laser ray transmitting material and the laser ray absorbing material in contact with each other:

$$\left[ \begin{array}{c} \text{structure with } R^1, R^2, R^3 \text{ on anthraquinone core with two C=O groups, linked via A to phenyl ring bearing } R^4, R^5, R^6, R^7, R^8, \text{ and via B to phenyl ring bearing } R^9, R^{10}, R^{11}, R^{12}, R^{13} \end{array} \right]_m^{m^-} \cdot m/n(K_i^{n+}) \qquad (1)$$

in Formula (1),
each of A and B independently represents —NH— or —O—,
each of $R^1$ to $R^3$ independently represents hydrogen, an amino group, a hydroxy group or a halogen,
each of $R^1$ to $R^{13}$ independently represents hydrogen, an alkyl group, a nitro group or a sulfonic group,
$K_i^{n+}$ represents an organic ammonium ion,
m represents 1 or 2, and
n represents 1 or 2;
the sulfonic group is —SO$_3$ or SO$_3$M, the number of —SO$_3$ being m, M representing hydrogen or an alkali metal, and each of M may be identical or not provided that the number of SO$_3$M is 2 or more;

$$Q=P/(S\cdot\phi)>0.4 \qquad (A)$$

where
Q: amount of heat on surface of laser ray absorbing material (J/mm$^2$)
P: output (W) of laser that laser ray transmitting material transmits
S: laser scanning speed (mm/sec)
$\phi$: spot diameter of laser (mm).

17. Method of laser welding of claim 16, wherein the primary particle diameter of said carbon black is 15 to 100 nm.

18. Method of laser welding of claim 17, wherein the BET specific surface area of said carbon black is 30 to 500 m$^2$/g.

19. Laser ray transmitting colored polyolefin resin composition of claim 1, which contains a yellow colorant, along with said anthraquinone salt forming dye and red azo salt forming dye.

20. Method of laser welding of claim 4, wherein said laser ray transmitting colored polyolefin resin composition contains a yellow colorant, along with said anthraquinone salt forming dye and red azo salt forming dye.

21. Laser ray transmitting colored polyolefin resin composition of claim 7, which contains a yellow colorant, along with said anthraquinone salt forming dye and red azo salt forming dye.

22. Method of laser welding of claim 8, wherein said laser ray transmitting colored polyolefin resin composition contains a yellow colorant, along with said anthraquinone salt forming dye and red azo salt forming dye.

23. Method of laser welding of claim 12, wherein said laser ray transmitting colored polyolefin resin composition contains a yellow colorant, along with said anthraquinone salt forming dye and red azo salt forming dye.

24. Method of laser welding of claim 16, wherein said polyolefin resin composition contains a yellow colorant, along with said anthraquinone salt forming dye and red azo salt forming dye.

25. A laser ray transmitting colored polyolefin resin composition containing an anthraquinone salt forming dye represented by Formula (1) below and a red azo salt forming dye the anionic component of which corresponds to a red azo acid dye selected from the group consisting of the dyes as C.I. Acid Red 1, 3, 4, 5, 7, 8, 9, 10, 12, 13, 14, 17, 18, 23, 24, 26, 27, 30, 33, 34, 35, 37, 40, 41, 54, 60, 66, 70, 73, 74, 88, 97, 102, 112, 115, 135, 137, 138, 141, 144, 148, 150, 151, 176, 231, and 266, the polyolefin resin composition containing 10 to 60% by weight of reinforcing glass fiber relative to said polyolefin resin, said polyolefin resin being polypropylene resin:

in Formula (1),
each of A and B independently represents —NH— or —O—,
each of $R^1$ to $R^3$ independently represents hydrogen, an amino group, a hydroxy group or a halogen,
each of $R^4$ to $R^{13}$ independently represents hydrogen, an alkyl group, a nitro group or a sulfonic group,
$K_i^{n+}$ represents an organic ammonium ion,
m represents 1 or 2, and
n represents 1 or 2;
the sulfonic group is —$SO_3$ or $SO_3M$, the number of —$SO_3$ being m, M representing hydrogen or an alkali metal, and each of M may be identical or not provided that the number of $SO_3M$ is 2 or more.

26. Laser ray transmitting colored polyolefin resin composition of claim 25, which contains a yellow colorant, along with said anthraquinone salt forming dye and red azo salt forming dye.

* * * * *